United States Patent
Skogman et al.

(10) Patent No.: US 8,898,102 B2
(45) Date of Patent: Nov. 25, 2014

(54) ADAPTIVE COMPUTATIONAL GRID FOR INVERSE PROBLEMS

(75) Inventors: Joel Skogman, Stockholm (SE); Mattias Enstedt, Uppsala (SE)

(73) Assignee: PGS Geophysical AS, Oslo (NO)

( * ) Notice: Subject to any disclaimer, the term of this patent is extended or adjusted under 35 U.S.C. 154(b) by 334 days.

(21) Appl. No.: 13/481,583

(22) Filed: May 25, 2012

(65) Prior Publication Data

US 2013/0318026 A1 Nov. 28, 2013

(51) Int. Cl.
*G06F 17/00* (2006.01)
*G06N 5/02* (2006.01)

(52) U.S. Cl.
CPC .................................... *G06N 5/02* (2013.01)
USPC .......................................................... 706/50

(58) Field of Classification Search
CPC ............................. G06N 5/02; G06T 2210/36
See application file for complete search history.

(56) References Cited

U.S. PATENT DOCUMENTS

| | | | |
|---|---|---|---|
| 4,617,518 A | 10/1986 | Srnka | |
| 7,191,063 B2 | 3/2007 | Tompkins | |
| 7,640,110 B2 | 12/2009 | Abubakar et al. | |
| 7,808,420 B2 | 10/2010 | Carazzone | |
| 7,987,074 B2 | 7/2011 | Carazzone et al. | |
| 8,131,522 B2 | 3/2012 | Ziolkowski et al. | |
| 2009/0006053 A1 | 1/2009 | Carazzone et al. | |
| 2009/0204327 A1 | 8/2009 | Lu et al. | |
| 2010/0018719 A1 | 1/2010 | Lu et al. | |
| 2010/0194394 A1 | 8/2010 | Zhandov et al. | |
| 2010/0315088 A1 | 12/2010 | Ziolkowski et al. | |
| 2011/0012601 A1 | 1/2011 | Hobbs et al. | |
| 2011/0291658 A1 | 12/2011 | Skogman et al. | |
| 2011/0316854 A1* | 12/2011 | Vandrovec ..................... 345/420 |
| 2013/0173163 A1 | 7/2013 | Zhandov et al. | |

FOREIGN PATENT DOCUMENTS

WO    WO 03/048812    6/2003

OTHER PUBLICATIONS

Hartmann et al. "An Adaptive Multilevel Multigrid Formulation for Cartesian Hierarchical Grid Methods", submitted to Elsevier Science, 2007, pp. 51.*
Abubakar et al. "A Fast and Rigorous 2.5D Inversion Algorithm for Cross-Well Electromagnetic Data" SEG/Houston 2005 Annual Meeting, EM 1.8, pp. 534-537 plus references sheet.
Alumbaugh et al. "Three-Dimensional Wideband Electromagnetic Modeling on Massively Parallel Computers" Radio Science, vol. 31, No. 1, pp. 1-23, Jan.-Feb. 1996, The American Geophysical Union.
Alumbaugh et al. "Three-Dimensional Massively Parallel Electromagnetic Inversion-II. Analysis of a Crosswell Electromagnetic Experiment" Geophys. J. Int. (1997) 128, 355-363.

(Continued)

*Primary Examiner* — Li-Wu Chang

(57) ABSTRACT

Techniques are described for determining an optimal resolution for a grid to be used in solving inverse problems. Reference physical fields may be computed based on model data for the computational grid at a starting resolution. Cells in the computational grid may be split in a plurality of iterations to provide finer resolution. The model data may be perturbed by introducing different physical property values to the cells. The physical fields may be calculated based on the perturbed model data. A comparison may be made between the reference physical fields and the calculated physical fields based on the perturbed model data for the purpose of determining whether cell splitting should continue.

27 Claims, 8 Drawing Sheets

(56) References Cited

OTHER PUBLICATIONS

Carazzone et al. "Three Dimensional Imaging of Marine CSEM Data" SEG/Houston 2005 Annual Meeting, EM 3.3, pp. 575-578 plus references sheet.
Carazzone et al. "Inversion Study of a Large Marine CSEM Survey" SEG Las Vegas 2008 Annual Meeting, pp. 644-647.
Commer et al. "A Parallel Finite-Difference Approach for 3D Transient Electromagnetic Modeling With Galvanic Sources" Geophysics, vol. 69, No. 5 (Sep.-Oct. 2004) pp. 1192-1202.
Commer et al. "Large Scale 3D EM Inversion Using Optimized Simulation Grids Nonconformal to the Model Space" SEG New Orleans 2006 Annual Meeting, pp. 760-764.
Commer et al. "New Advances in Three-Dimensional Controlled-Source Electromagnetic Inversion" Geophys. J. Int (2008) 172, pp. 513-535.
Commer et al. "Three-Dimensional Controlled-Source Electromagnetic and Magnetotelluric Joint Inversion" Article first published on Jun. 8, 2009, Lawrence Berkeley National Laboratory Journal Compilation, 7 pages.
Commer et al. "Massively-Parallel Electrical-Conductivity Imaging of Hydrocarbons Using the Blue Gene/L Supercomputer" Lawrence Berkeley National Lab, Jun. 24, 2008, 33 pgs.
Ian T. Foster "Designing and Building Parallel Programs—Concepts and Tools for Parallel Software Engineering" Addison-Wesley Publishing Company, 1995, 10 pages.
Komatitsch et al. "Simulation of Anisotropic Wave Propagation Based Upon a Spectral Element Method" Geophysics, vol. 65, No. 4 (Jul.-Aug. 2000); pp. 1251-1260.
MacGregor et al. "Electrical Resistivity Structure of the Valu Fa Ridge, Lau Basin, From Marine Controlled-Source Electromagnetic Sounding" Geophys. J. Int. (2001) vol. 146, pp. 217-236.
Newman et al. "Three-Dimensional Massively Parallel Electromagnetic Inversion—I. Theory" Geophys. J. Int. (1997) vol. 128, pp. 345-354.
Newman et al. "Three-Dimensional Megnetotelluric Inversion Using Non-Linear Conjugate Gradients" Geophys. J. Int. (2000) vol. 140, pp. 410-424.
Newman et al. "Sandia Report" DAND96-0582, UC-400, 403, 405, Unlimited Release, printed Mar. 1996, Sandia National Laboratories, 125 pages.
Newman et al. "Solution Accelerators for Large-Scale Three-Dimensional Electromagnetic Inverse Problems" Institute of Physics Publishing, Inverse Problems 20 (2004), PII: S0266-5611(04)78789-4, pp. S151-S170.
Newman et al. "New Advances in Three Dimensional Transient Electromagnetic Inversion" Geophys. J. Int. (2005) vol. 160, pp. 5-32.
Newman et al. "New Solution Strategies for Solving Large Scale 3D Electromagnetic Inversion Problems" $23^{rd}$ Annual Review of Progress in Applied Computational Electromagnetics, Mar. 19-23, 2007—Verona, Italy, pp. 628-634.
Newman et al. "Imaging Data in the Presence of Electrical Anisotrophy" Geophysics, vol. 75, No. 2 (Mar.-Apr. 2010); pp. F51-F61.
Newman et al. "Solution Strategies for Two- and Three-Dimensional Electromagnetic Inverse Problems" Inverse Problems 16 (2000), pp. 1357-1375, PII:S0266-5611(00) 12357-3, IOP Publishing Ltd.
Newman et al. "Three-Dimensional Magnetotelluric Modeling and Inversion: Application to Sub-Salt Imaging" Methods in Geochemistry and Geophysics, 35, Proceedings of the Second International Symposium, 2002 Elsevier, Chapter 8, 27 pages.
Newman et al. "3D Inversion of a Scalar Radio Magnetotelluric Field Data Set" Geophysics, vol. 68, No. 3 (May-Jun. 2003); pp. 791-802.
Paragon Manual downloaded Nov. 29, 2011 "application—Executes a parallel application." web.archive.org/web/20010308060410/http://www.sandia.gov/ASCI/Red/usage/ .../application.1.html , 12 pages.

* cited by examiner

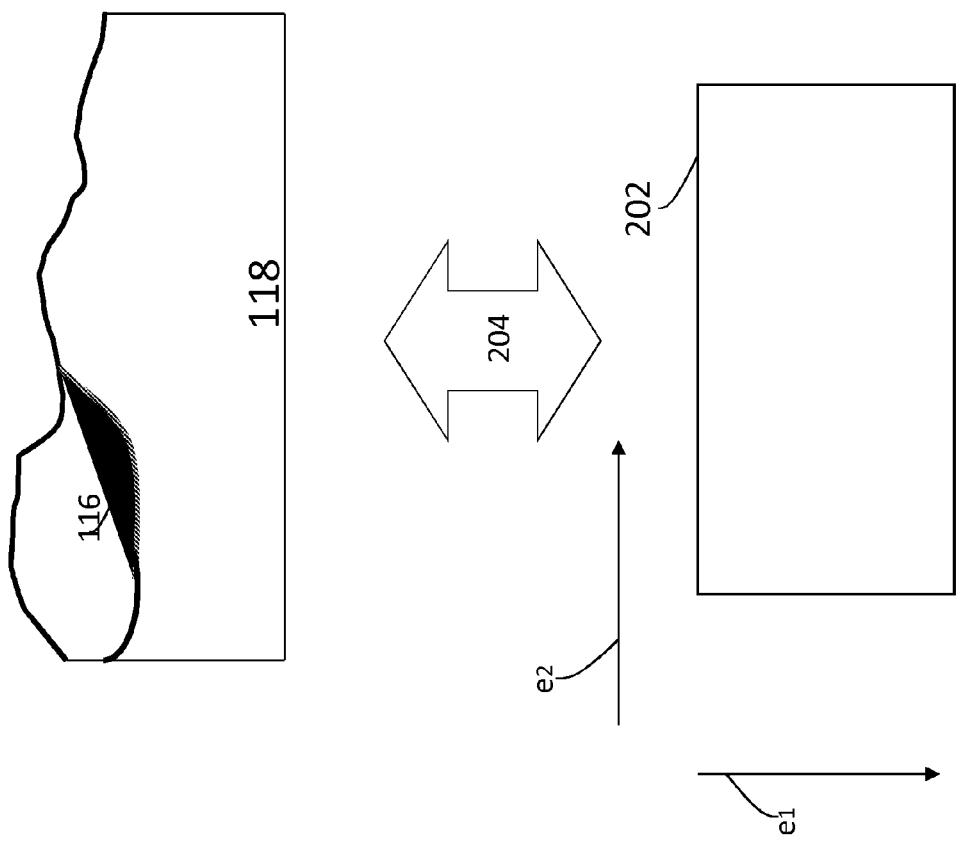

300-1

┌─────────────────────────────────────────┐
│ perform one or more initial setup tasks  302 │
└─────────────────────────────────────────┘
                    │
┌─────────────────────────────────────────┐
│ specify a starting grid resolution  304 │
└─────────────────────────────────────────┘
                    │
┌─────────────────────────────────────────┐
│ compute physical properties of cells at the │
│ Starting grid resolution  306 │
└─────────────────────────────────────────┘
                    │
┌─────────────────────────────────────────┐
│ determine one or more reference physical │
│ Field $E_0$  308 │
└─────────────────────────────────────────┘

FIG. 3A

ADAPTIVE COMPUTATIONAL GRID FOR INVERSE PROBLEMS

BACKGROUND

In the past few decades, the petroleum industry has invested heavily in the development of marine survey techniques that yield knowledge of subterranean formations beneath a body of water in order to find and extract valuable mineral resources, such as oil and natural gas. High-resolution seismic images of a subterranean formation are essential for quantitative seismic interpretation and improved reservoir monitoring. For a typical towed marine survey, an exploration vessel tows one or more physical sources such as seismic sources and one or more streamers below the surface of the water and over a subterranean formation to be surveyed for mineral deposits. The vessel contains data acquisition equipment, such as navigation control, physical source control, data receiver control, and recording equipment. The physical source control causes the one or more physical sources to produce physical fields at selected times. Physical fields may be electric fields, magnetic fields, electromagnetic wave fields, or acoustic wave fields that interact with the water and the subterranean formation. Different types of rock may possess different physical properties and affect these physical fields differently. The streamers towed behind the vessel are elongated cable-like structures. Each streamer includes a number of data receivers or sensors that detect the physical fields underwater as affected by the water and the subterranean formation.

However, acquiring high quality high resolution data in a marine environment may be relatively expensive and complex. Techniques used to determine physical properties based on data measurements may or may not be effective and reliable. As a result, those working in this industry continue to seek systems and methods to improve performance of analyzing physical properties of a particular region based on collected physical field data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts example physical and logical representations of a spatial domain of exploration;

FIG. 3A and FIG. 3B depict example process flows for determining an optimal grid resolution of an adaptive computational grid;

Figure 1:
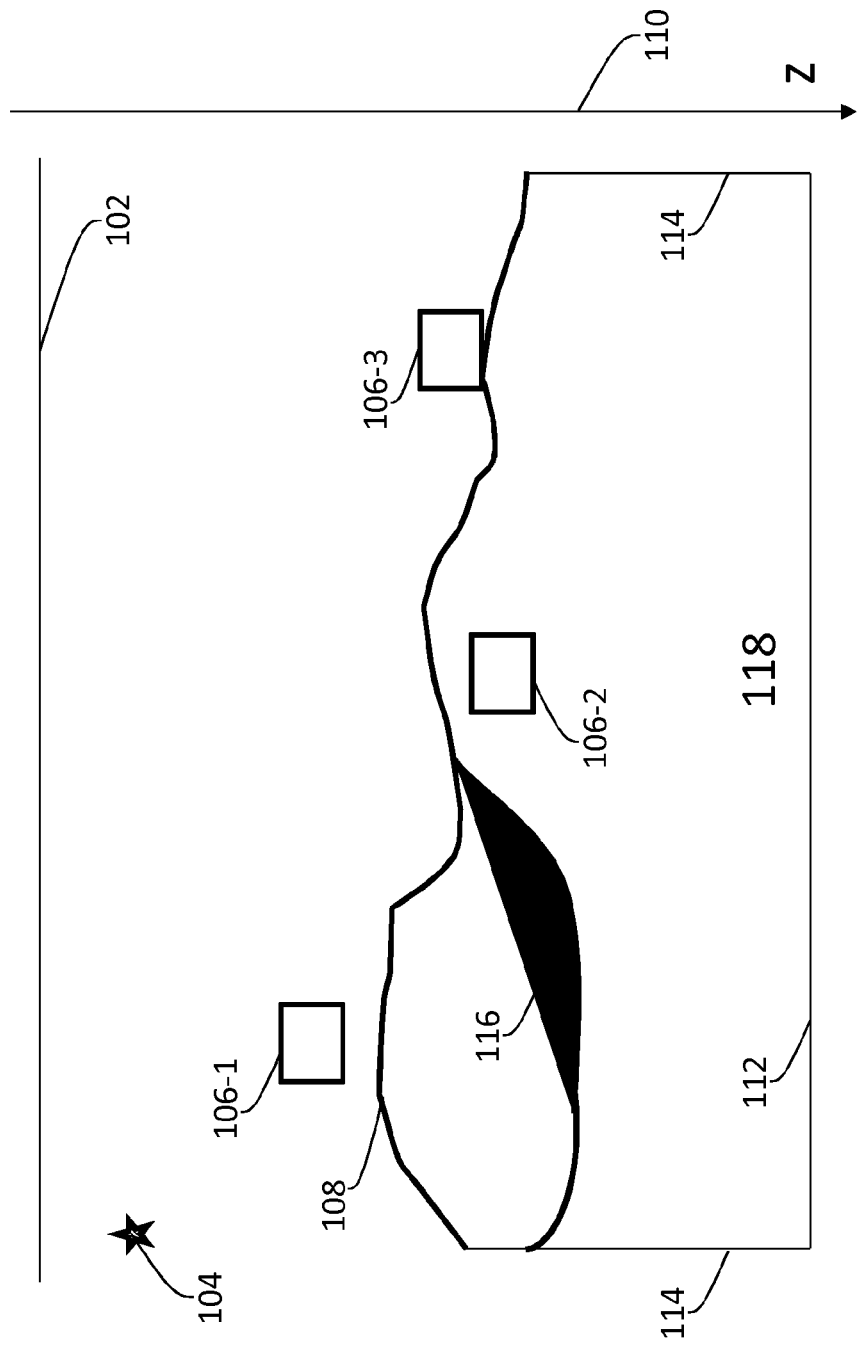
FIG. 1 depicts a schematic view of a survey environment.

The drawings are not drawn to scale.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

1. OVERVIEW
2. PHYSICAL FIELD MEASUREMENTS
3. ADAPTIVE COMPUTATIONAL GRID
4. DETERMINING AN OPTIMAL GRID RESOLUTION
5. EXAMPLE IMPLEMENTATION OF DETERMINING AN OPTIMAL GRID RESOLUTION
6. EXAMPLE IMPLEMENTATIONS
7. EXTENSIONS AND ALTERNATIVES

1. Overview

An approach is described for determining an optimal resolution for a computational grid to be used in solving inverse problems. As described in more detail hereinafter, the approach may be implemented on an apparatus that includes one or more processors and one or more storage media storing instructions, which, when processed by the one or more processors, causes performance of one or more operations for determining an optimal grid resolution for an adaptive computational grid. According to the approach, first values of one or more physical fields at first spatial locations are computed based upon one or more first values of one or more physical properties for a first set of cells. The first set of cells constitutes a computational grid that represents a spatial domain of exploration. The first set of cells is transformed into a second set of cells by splitting at least one cell in the first set of cells into two or more new cells. Values of the one or more physical properties for the two or more new cells are determined based upon the one or more first values of the one or more physical properties for the first set of cells. Second values of the one or more physical fields at second spatial locations are computed based upon second values of the one or more physical properties for the second set of cells. A determination is made whether differences between the second values of the one or more physical fields at the second spatial locations and the first values of the one or more physical fields at the first spatial locations satisfy one or more criteria for further cell splitting of the two or more new cells. If differences between the second values of the one or more physical fields at the second spatial locations and the first values of the one or more physical fields at the first spatial locations do not satisfy the one or more criteria, then (a) the first set of cells is transformed into a different second set of cells by splitting one or more other cells in the first set of cells into two or more other new cells, the one or more other cells being selected from a plurality of cells in the first set of cells ordered along a first spatial direction, and the plurality of cells being all on a first side of the at least one cell in relation to the first spatial direction; (b) two or more new values of the one or more physical properties for the two or more other new cells are determined based upon the one or more first values of the one or more physical properties for the first set of cells; and (c) different second values of the one or more physical fields at different second spatial locations are computed based upon the different second values of the one or more physical properties for the different second set of cells. In response to determining that the differences between the second values of the one or more physical fields at the second spatial locations and the first values of the one or more physical fields at the first spatial locations satisfy the one or more criteria, then (a) the second set of cells is transformed into a third set of cells by splitting one or more cells in the second set of cells into two or more second new cells, both the at least one cell and the one or more cells being selected from a plurality of cells in the second set of cells ordered along a first spatial direction, and the plurality of cells being all on a second side of the at least one cell in relation to the first spatial direction; (b) two or more new values of the one or more physical properties for the two or more other new cells are determined; and (c) third values of the one or more physical fields at third spatial locations are computed based upon third values of the one or more physical properties for the third set of cells. In response to determining that the differences between the second values of the one or more physical fields at the second spatial locations and the first values of the one or more physical fields at the first spatial locations satisfy the one or more criteria, then (a) the second set of cells is transformed into a third set of cells by splitting one or more cells in the second set of cells into two or more second new cells, the at least one cell comprises a terminating cell in a first plurality of cells, in the first set of cells, ordered along a first spatial direction, and the one or more cells in the second set of cells being selected from a second plurality of cells, in the second set, ordered along a second different spatial direction; (b) two or more new values of the one or more physical properties are determined for the two or more second new cells; and (c) third values of the one or more physical fields at third spatial locations are computed based upon third values of the one or more physical properties for the third set of cells. Example physical properties include, without limitation, electric conductivity, magnetic permeability, mass density, elasticity, pressure, particle velocity, or other types of physical properties. Example physical fields include, without limitation, electric fields, magnetic fields, electromagnetic fields, acoustic fields, or other types of physical fields. In an embodiment, the first spatial locations comprise at least one common spatial location with the second spatial locations.

2. Physical Field Measurements

Embodiments include a method of determining an optimal grid resolution of a computational grid representing a spatial domain (or volume) of exploration for solving inverse problems based at least in part on measured physical field data. The physical field data may be measured and collected with one or more of a variety of sensors deployed in a marine survey environment.

FIG. 1 depicts a schematic view of an example survey environment (a marine survey environment for the purpose of illustration only). A physical field source 104 represents an appropriate source to activate one or more physical fields in the marine survey environment. One or more of a variety of physical field stimuli may be generated by the physical field source 104. While depicted as a point source for the purpose of illustration only, a physical field source such as 104 may comprise one or more of point sources, distributed sources, patterned sources, deployed by a survey ship, deployed in coordination with a survey ship, etc. In some embodiments, the physical field source 104 may be towed by a ship, and may be activated to generate one or more physical fields. In an example, the physical field source 104 may be an electromagnetic source generating electromagnetic wave fields, and may be one or more of a variety of types, including but not limited to an electromagnetic wave field emitter. In another example, the physical field source 104 may be a seismic source generating acoustic wave fields, and may be one or more of a variety of types, including but not limited to a small explosive charge, an electric spark or arc, a marine vibrator, and a seismic source gun. A physical field source such as 104 may comprise one or more source elements in a source configuration. A physical field source such as 104 may be configured, but is not limited, to generate a short-duration impulse, a square wave, a sine wave, a static signal, broadband signal, pseudo-random signal, etc.

In an example, receivers (e.g., 106-1) may be deployed with streamers that are towed from a survey ship or other vessel in the body of water between a sea surface 102 and a sea floor 108. In another example, receivers (e.g., 106-3) may or may not be attached to a vehicle; for example, receivers (106-3) may be placed near or on the sea floor (108). In yet another example, receivers (e.g., 106-2) may be located in the subterranean region below the sea floor (108), for example in bores.

Measurements of the physical fields at a particular location may be obtained from one or more sensors. As used herein, a sensor may be configured to directly or indirectly measure quantities relating to one or more physical fields, for example, as a function of time in one or more time intervals.

As depicted in FIG. 1, a z-axis 110 may be used to represent depths below a horizontal reference plane. When a flat sea surface assumption applies to some, but not necessarily all, operations performed using techniques as described herein, the sea surface 102 may be approximated by the horizontal reference plane. Without loss of generality, the z value (or depth) at the horizontal reference plane may be set to zero.

In some embodiments, each receiver in the plurality of receivers comprises at least one sensor. In some embodiments, each receiver in the plurality of receivers comprises only one type of receiver. In an example, a receiver may comprise at least one electric field sensor but no magnetic field sensor. In another example, a receiver may comprise at least one acoustic field sensor such as velocity sensors or pressure sensors but no electric or magnetic field sensor. In yet another example, a receiver may comprise one or more of acoustic field sensors, electric field sensors, magnetic field sensors, electromagnetic wave field sensors, etc.

The marine survey environment may comprise a spatial domain (or one or more spatial volumes) of exploration (e.g., 118). In an example, a spatial domain of exploration is a subterranean spatial region under the sea floor (108) as depicted in FIG. 1. In another example, a spatial domain of exploration includes one or more portions of subterranean spatial regions, the body of sea water, or the Earth's atmosphere.

As depicted in FIG. 1, the spatial domain of exploration (118) may, but is not limited to, be bounded by a bottom surface (112) at a certain depth along the z-axis. Additionally, optionally, or alternatively, as depicted in FIG. 1, the spatial domain of exploration (118) may, but is not limited to, be bounded by one or more side surfaces (114). A bottom surface bounding the spatial domain of exploration (118) may or may not be a plane as depicted in FIG. 1. In some embodiments, instead of being a horizontal plane, the bottom surface (112) may be a continuous curved surface continued from the one or more side surfaces (114) with or without recognizable edge lines between the bottom surface (112) and the one or more side surface (114). Generally speaking, a side surface as described herein may or may not be formed of vertical straight lines, but rather may be formed by curves, piece-wise segments of lines or curves that are not necessarily represented by vertical straight lines as depicted in FIG. 1. Receivers may be spaced regularly or irregularly at a plurality of different locations in the marine survey environment. In an example, electric field sensors may be deployed in various locations of the sea floor (108) to detect boundary conditions of the spatial model of the Earth (118). In another example, magnetic field sensors may be deployed in various locations of the body of sea above the sea floor (108) to detect far field conditions of the spatial model of the Earth (118). In yet another example, motion sensors may be deployed in various locations of the interior of the spatial domain of exploration (118) to detect interior physical fields inside the spatial model of the Earth (118). Additionally, optionally, or alternatively, more than one type of sensor may be concurrently used to sense physical fields; likewise, more than one type of location may be concurrently used to deploy any of the sensors in a spatial configuration of the sensors.

In a non-limiting example embodiment, a towed system may be used to deploy a controlled electromagnetic source to induce and measure electromagnetic (EM) fields in a marine environment, for example, as depicted in FIG. 1. Measured field data collected by sensors deployed with the towed system may then be used to determine physical properties in a spatial model of the Earth.

As used herein, "a spatial model of the Earth" may be a representation of (a portion or whole of) a marine survey environment containing a spatial domain (or volume) of exploration (e.g., 118). The spatial model of the Earth may be used as a part of input data to compute/deduce physical quantities such as physical properties and/or physical fields in the marine survey environment based on physics and mathematics adopted for solving the relevant physics and mathematics problems involved in computing the physical quantities. As used herein, a source (e.g., 104) may operate in various different modes or in different spatial and/or time configurations. In some embodiments, source signals from the source (104) may be optimized in terms of types, forms, locations, intensities, configurations, etc., for probing the survey environment. Additionally, optionally, or alternatively, when the source (104) emits a time continuous source signal, measured field data may be a part, or all, of collected field data relating to one or more time slices/intervals and/or to one or more spatial volumes of the Earth in the survey environment.

3. Adaptive Computational Grid

Techniques such as forward modeling, as selected from a wide variety of available techniques, may be applied (a) to compute (forwardly) physical fields (e.g., EM fields, acoustics fields, etc.) based on model data comprising a set of parameters that may include but not limited to physical property data in the spatial model of the Earth, or (b) to compute (inversely) physical properties such as conductivity, magnetic permeability, density, elasticity, etc., based on a set of parameters that may include but are not limited to physical field data. Physical field data or physical property data that are used in computation may be directly or indirectly derived from measured physical field data, measured physical property data, assumptions and knowledge relating to the physics, mathematics, the spatial model of the Earth, the spatial domain of exploration, etc.

Example techniques include, without limitation, one or more of physical formulas such as Maxwell's equations, diffusion equations, acoustic field equations, wave decomposition, field propagation, mathematical expressions such as integral equations, convolutions/deconvolutions, filters, transformations, matrixes, etc.

Operators, matrixes, equations, expressions, etc., generated using available techniques may be used as a part of a process or algorithm for solving an inverse problem in which one or more physical properties (e.g., conductivity/resistivity, magnetic permeability, etc.) of the spatial model of the Earth are searched for to match, in some ways, measured field data. In some embodiments, a computational grid that comprises a number of cells may be used to represent the spatial domain of exploration. Domains of the physical properties of the cells in the computational grid may be searched to determine values of the physical properties that yield a best match between calculated values of the physical fields and the measured field data.

It can be difficult to determine how coarse or fine a computational grid should be used to cover the spatial domain of exploration before selected methods are applied to search for physical properties in the spatial domain of exploration. Using a grid resolution that is too coarse to indicate the presence of an anomaly (e.g., an oil reservoir, a metallic deposit, a seismic discontinuity, etc.) is problematic because the anomaly may be located in a small part of a large cell in the coarse grid. As a result, an indication of the non-presence of an anomaly in a cell associated with an overly coarse grid resolution may be a false negative. Alternatively, a grid resolution that is too fine may, given the data, be more resource-consuming and not provide any additional information that is useful.

The use of a computational grid with a finer or coarser grid resolution than necessary may be expensive to operate in many ways. In the case of an overly coarse grid resolution, opportunities of scoring anomalies may be missed and hence related measurements and computations are wasted. In the case of an overly fine grid resolution, an even greater number of measurements and computations than that of an overly coarse grid resolution may be required in order to compute with the overly fine grid resolution. However, since indications of anomalies, as computed with an overly fine grid resolution, are not effectively supported by measured field data, these indications are not of high quality. Subsequent test drilling in a cell associated with a false positive indication of an anomaly may waste more time and resources than what were spent in the survey and computation.

Instead of using a computational grid with a fixed resolution that may be too coarse or too fine, techniques as described herein may be configured to use an adaptive computational grid to (a) handle realistic situations in which there may be more than one possible solution and/or more than one possible grid resolution to an inversion problem, and (b) determine an optimal resolution of a grid that covers a spatial domain of exploration for solving the inverse problem, among multiple possible solutions and/or multiple possible grid resolutions. The techniques as described herein may be configured to be performed programmatically and/or automatically by one or more computing devices associated with a marine survey system or a seismic survey system.

As used herein, "an optimal grid resolution" refers to a (minimal) spatial resolution, of a grid that covers a spatial domain of exploration, which measured field data is capable of supporting/differentiating. The term "adaptive computational grid" refers to a grid used by techniques as described herein to programmatically and/or automatically adjust or change spatial resolutions of the computational grid in one or more processes for determining the optimal resolution of the computational grid. As would be understood by one of ordinary skill in the art with the benefit of this disclosure, "an optimal grid resolution" may or may not be the theoretically achievable absolute minimum spatial resolution capable of supporting/differentiating, but rather indicates a reasonably realistically achievable value given the operational constraints of the survey environment and computational resources.

The determination of an optimal grid resolution for the adaptive computational grid may be partly based on knowledge about realistic solutions from mathematics or physics. For example, measured field data collected on a substantially flat data acquisition surface may support relatively fine resolution computations along spatial directions that are substantially parallel to the data acquisition surface or substantially vertical to the normal direction of the data acquisition surface in relation to computations along a spatial direction that is substantially vertical to the data acquisition surface or substantially parallel to the normal direction of the data acquisition. Thus, spatial resolutions of the adaptive computational grid may or may not be uniform and/or isotropic in spatial directions. In some embodiments, different spatial configuration (e.g., tangential to the sea surface, cross sectional as depicted in FIG. 1, etc.) used in collecting measured field data may support different spatial resolutions in different spatial directions. In some embodiments, information about which spatial direction(s) is likely to support relatively fine resolution computations and which spatial direction(s) is likely to support relatively coarse resolution computations may be used to determine an optimal resolution along these spatial directions. In some embodiments, measured field data may support higher resolution in the shallow parts and lower resolution in the deep parts in the spatial model of the Earth.

Physical properties determined with an optimal grid resolution may be more reliable than those obtained with less-optimal grid resolutions, since false positives and/or false negatives in indicating the presence of anomalies are reduced with the physical properties determined with the optimal grid resolution. Hence, the presence of anomalous physical properties determined for one or more cells in a grid with an optimal resolution is more likely to indicate a genuine anomaly in a spatial domain of exploration.

4. Determining an Optimal Grid Resolution

An optimal grid resolution for an adaptive computational grid may be automatically determined based at least in part on measure field data. A spatial model of the Earth may initially be identified. The spatial model may, but is not limited to, include the topology of a marine survey environment including but not limited to one or more portions of the sea surface, sea floor, any known or assumed subterranean structures or features, the Earth's atmosphere, etc.

An computational adaptive computational grid may be used to discretize a model of a physical spatial domain of exploration in the spatial model of the Earth. The physical spatial domain of exploration may be determined or selected based on the likelihood that it may contain a (geophysical) anomaly whose presence may cause one or more physical properties to have different values in cells containing the anomaly than those in cells not containing the anomaly.

A starting grid resolution may be selected for the computational grid. In an example, at the starting grid resolution, the computational grid may comprise a single cell. In another example, at the starting grid resolution, the computational grid may comprise two cells. In other examples, at the starting grid resolution, the computational grid may comprise other numbers of cells.

The computational grid may comprise cells arranged along one or more spatial directions. In an example, one or more of the spatial directions may be based on spatial direction(s) (e.g., z-axis of FIG. 1; one of x and y axes vertical to each other and to the z-axis; etc.) in the physical topology of the marine survey environment. In another example, one or more of the spatial directions may be based on spatial direction(s) in a logical space. In the logical space, the spatial domain of exploration—which may or may not be a regular geometric shape in the physical topology of the marine survey environment—may be represented with a regular geometric shape such as a rectangle, a polygon, a sphere, etc. for ease of computation. Starting values of one or more physical properties for each of the cells at the starting grid resolution may be computed. As there are relatively few cells to compute, these starting values may be relatively efficiently determined based on the underlying physics and mathematics, for example, by solving appropriate inverse problems for the computational grid at the starting grid resolution.

In some embodiments, values of the physical properties for the cells of the adaptive computational grid at the starting grid resolution may be determined by comparing some or all possible mapped values of the physical fields corresponding to some or all possible values of the physical properties of the cells with target values of the physical fields. Examples of target values of the physical fields may be values sourced or derived from the measured physical field data, for example, at one or more locations in the spatial model of the Earth. Examples of mapped values of the physical fields may be values computed from candidate values of the physical properties, for example, through underlying the physics principles or through the forward mapping operator previously mentioned. The mapped values may, but are not limited only to any of, be associated with the one or more locations with which the target values may be associated.

This comparison may be performed with one or more distance defined between target values of the physical fields and mapped values of the physical fields. Examples of distances between target values of the physical fields and mapped values of the physical fields include, but are not limited only to any of: L-2 norms based on the given values and the mapped values.

In some embodiments, the values of the physical properties of the cells at the starting grid resolution may be obtained by setting target values based on measured field data and then finding a local extremum (e.g., a local minimum, etc.) for the one or more distances between the target values set based on the measured field data and the mapped values (which may be functional values with the physical properties as independent variables). In some embodiments, values of the physical properties at the local extremum thus found are interpreted as a best-fit for the measured field data in the spatial model of the Earth for the adaptive computational grid at the starting grid resolution.

After the physical properties of the cells in the computational grid with the starting grid resolution are determined, a forward mapping operator may be used to forwardly map the physical properties of cells in the adaptive computational grid to the physical fields at a number of locations in the spatial model of the Earth. These locations may correspond to, but are not limited to any of, locations at which measured field data is collected. In an example, the forward mapping operator may be used to map electric conductivity and/or magnetic permeability of the cells to an electromagnetic field at the locations, based on some or all of Maxwell's equations or a mathematical representation thereof. In another example, the forward mapping operator may be used to map density and/or elasticity of the cells to acoustic fields (particle velocity field, pressure field, etc.) at the locations, based on wave decomposition, convolution/deconvolution, wave propagation, or mathematical representations thereof. The forward mapping operator may, but is not limited to, incorporate information relating to the topology of the spatial model of the Earth, the physical source, the spatial domain of exploration, the locations at which measured physical field data was collected, the physics principles involved in the physical quantities and physical fields, the mathematics tools employed in the computation, etc.

The resolution of the adaptive computational grid may be increased from the starting resolution by dividing existing cells in the adaptive computational grids along the one or more spatial directions. For example, an existing cell (or a pre-split cell) in the adaptive computational grid at the starting resolution may be split into two new cells, thereby giving rise to a new resolution of the adaptive computational grid.

The values of the physical properties for the pre-split cell may be used as a basis to assign or compute values of the physical properties for each of the new cells. The values of the physical properties of the new cells may be displaced (or different) values from the values of the physical properties of the pre-split cell, thereby introducing perturbations to the physical properties from which calculated values of the physical field may be obtained through forward mapping or forward modeling techniques. In an example, if the pre-split cell has a conductivity value of 100, conductivity values of the new cells may be given as 75 and 125, respectively. In another example, conductivity values of the new cells may be given by different values, for example, based on one or more distribution ratios or functions. Some of the distribution methods used to determine new values of the physical properties for the new cells may even take into consideration of neighboring cells adjacent to the pre-split cell. Thus, in various embodiments, one or more methods may be selected from a wide variety of methods to determine the values of the physical properties of the new cells, in order to introduce perturbations to the physical properties.

Using the displaced values of the physical properties of the new cells and values of the physical properties of other cells (which are not split or are not yet split), new values of the physical fields may be computed. The computation of the physical fields herein may use the same physics principles and mathematics used to determine or develop the forward mapping operator. The forward mapping operator may be directly applied to compute the new values of the physical fields based on the displaced values and other existing values of the physical properties.

The new values of the physical fields may be compared with reference values of the physical fields. The reference values may be set the same as the target values used in determining the starting grid resolution. The reference values may be determined based directly on the measured physical field data, or computed anew without regards to the measured field data.

The values of the physical properties of the cells in the adaptive computational grid at the starting grid resolution may be obtained based on locating a local extremum of the one or more distances. These values of the physical properties may be used to derive calculated values of the physical fields given the topology of the spatial model of the Earth and source information. The calculated values of the physical fields may be directly derived with the forward mapping operator(s). The calculated values of the physical fields may be set as the reference values. The reference values may be considered as a version of the physical fields without noises that may be present in the measured physical field data.

Embodiments include using one or more of a wide variety of techniques to determine reference values of the physical fields based on a previous grid resolution. The previous grid resolution may be the starting grid resolution, or subsequent intermediate grid resolution before an optimal grid resolution is determined.

Comparing the reference values of the physical fields, as determined with a previous grid resolution, with the new values of the physical fields, as determined based at least in part on the displaced values of the physical properties for the (split) new cells, may make use of one or more thresholds. Example thresholds include, without limitation, fixed absolute values, fixed relative values, functional values, table-driven values and statistics-based values, etc. One or more of a wide variety of techniques may be used to measure deviations between the reference values and the new values.

The splitting of existing cells of the adaptive computational grid may be repeated if the comparison of the reference values of the physical fields and the new values of the physical fields indicates that the deviations between these two types of values of the physical fields are within the one or more thresholds. The deviations within the thresholds may be interpreted as indicating the measured physical field data is capable of supporting further cell splitting from the adaptive computational grid with the higher grid resolution that includes the new cells. Cell splitting as described above may be iteratively or recursively performed for all cells, or a subset of cells, resulting in a finer and finer discretization or grid resolution until the thresholds (or criteria) measuring deviations (or differences) between the calculated physical field values and the reference physical field values are no longer satisfied, at which point, cell splitting may then stop.

In some embodiments, the splitting of cells may be performed along the one or more spatial directions. For each instance of splitting cells, the actions such as determining new (displaced) values of the physical properties of new (split) cells, computing the new values of the physical fields based at least in part on the new (displaced) and existing values of the physical properties, and comparing the reference values and the new values of the physical fields may be repeated iteratively and/or recursively, until deviations between the reference values and the new values of the physical fields exceed thresholds. The thresholds as described herein may be specified as functionals (e.g., system-configured functionals, user-configured functionals, etc.) and may vary from one grid resolution to the next. In some embodiments, deviations between new values and reference values of the physical fields that exceed the thresholds may be interpreted as meaning that the measured physical field data does not support further cell splitting in the one or more spatial directions from the grid resolution of the adaptive computational grid. This could mean that, if a further grid resolution should be desired, higher density measured physical field data than the present measured physical field data might be required to support the further grid resolution.

In some embodiments, values of the physical properties in cells of the adaptive computational grid may be re-evaluated or recomputed by solving inverse problems at some point, for example after a number of instances of cell splitting have been performed, after cell splitting has been completed for a particular spatial direction, or after cell splitting causes thresholds to be exceeded. After the re-evaluation of the physical properties, the contemporaneous grid resolution of the adaptive computational grid may be designated as the new starting grid resolution. The re-evaluated values of the physical properties may be designated as new starting values of the cells of the adaptive computational grid. Additionally, optionally, or alternatively, the re-evaluated values of the physical properties of the cells may be used to generate new reference values of the physical fields used in comparing with, and determining deviations (differences) of, calculated values of the physical fields based on displaced values following one or more instances of cell splitting.

When the foregoing process is finished for the adaptive computational grid, the resultant grid resolution may be determined as the optimal grid resolution that should be used in inversion algorithms that aim to compute physical properties based on the measured physical field data.

5. Example Implementation of Determining an Optimal Grid Resolution

In some embodiments, algorithms to determine the optimal grid resolution may be configured to work with the computational grid as directly represented in the physical coordinates (e.g., z-axis of FIG. 1, and x-y axes perpendicular to each other and to the z-axis of FIG. 1) of a spatial model of the Earth. Since the spatial domain of exploration in the physical space may, but may not always, be of a regular shape, the computational grid represented in the physical space may not be of a regular shape in many scenarios. Additionally, optionally, alternatively, the cells in the computational grid, as represented in the physical space, may or may not be of regular shapes. In some embodiments, operators, functional, spatial directions, physical or mathematical equations, etc., used in the algorithms may be expressed in the physical coordinates (x-y-z coordinates). Computations, cell splitting, threshold-based comparison, forward mapping, etc., may also be performed in the physical coordinates (x-y-z coordinates).

In some other embodiments, as depicted in FIG. 2, instead of working with a spatial domain of exploration (118) in physical coordinates (e.g., Cartesian coordinates in the physical space), algorithms to determine the optimal grid resolution may be configured to work with a grid (202) that represents the spatial domain of exploration (118) in a set of logical coordinates (e.g., $e_1$, $e_2$, and $e_3$, which may or may not correspond to the x-z-y coordinates via linear spatial transformations). As depicted in FIG. 2, even if the spatial domain of exploration (118) in the physical space does not have a regular shape, one or more spatial transformations (204), which may, but are unlikely to, be linear spatial transformations, may be used to map the physical coordinates to the logical coordinates such that the computational grid (204) in the logical coordinates may, but is not required to, be of a regular shape, or a combination of regular shapes. Additionally, optionally, alternatively, cells (in the computational grid) represented in the logical coordinates may, but are not required to, be of a regular shape such as a square, a rectangle, a polygon, etc. In some embodiments, operators, functional, spatial directions, physical or mathematical equations, etc., used in the algorithms may be expressed with the logical coordinates ($e_1$, $e_2$, and $e_3$). In some embodiments the expressions for these constructs used in the algorithms in the logical coordinates may be obtained from corresponding expressions for the same constructs by applying the spatial transformations (204) between the physical coordinates and the logical coordinates as necessary. In some other embodiments, physics principles may be expressed in the logical coordinates to enable derivations of logically represented constructs for the algorithms. Computations, cell splitting, threshold-based comparison, forward mapping, etc., may also be performed with the logical coordinates ($e_1$, $e_2$, and $e_3$).

For the purpose of illustration only, one or more specific algorithms that work adaptively to determine an optimal grid resolution of a grid that is used to cover a spatial domain of exploration in solving an inverse problem are described hereinafter. It should be noted, however, that similar algorithms and/or variations to the depicted algorithms may be used to determine an optimal grid resolution in alternative embodiments. In some embodiments, the physical coordinates may be used to determine an optimal grid resolution. In some embodiments, logical coordinates with the same or different dimensionalities may be used to determine an optimal grid resolution. In some embodiments, one or more quantities/variables in the underlying physics or mathematics may be additionally, optionally, or alternatively be represented in one or more logical coordinates. In some embodiments, due to symmetry, simplification, approximation, postulations, assumptions or other reasons relating to the physics and mathematics, a physical coordinate (e.g., a particular spatial direction) may be omitted. These and other variations of algorithms to determine an optimal grid resolution may be used in various embodiments.

FIG. 3A depicts an example process flow (300-1) according to an example embodiment. In some embodiments, a resolution optimization system (e.g., 500 of FIG. 5) comprising one or more computing devices or components may perform this process flow (300-1).

In block 302, the resolution optimization system performs one or more initial setup tasks. Examples of initial setup tasks may include, but are not limited to any of: selecting physical coordinates (e.g., z-axis of FIG. 1) for a spatial model of the Earth that includes a spatial domain of exploration (e.g., 118 of FIG. 1), incorporating information relating to one or more inversion problems that are to be solved by a grid with an optimal resolution determined under techniques as described herein, specifying one or more topologies for the spatial model of the Earth or any components therein, selecting one or more forward modeling algorithms (e.g., forward mapping operators) based on physics equations or mathematics tools that map one or more physical properties in the spatial model of the Earth to one or more physical fields, selecting one or more target functionals (which may be defined in L-2 forms, etc., and may be configured to provide measures of distances between calculated physical fields based on physical properties at critical points, local extrema, etc., and target physical fields, for example, derived from measured physical field data; the target functionals may be defined in approximation to simplify computation) associated with the forward modeling algorithms, specifying one or more spatial transformations between the physical coordinates and a set of logical coordinates such that the spatial domain of exploration may be mapped to a grid comprising one or more regular shapes in a logical space parametrized with the logical coordinates. The computational grid may be adaptive in the sense that its resolution may be adjusted/changed in an iterative and/or recursive process until an optimal resolution is determined.

In block 304, the resolution optimization system specifies a starting resolution for the computational grid. In some embodiments, a small number of cells may be selected at the starting resolution. In some embodiments, a single cell may be selected for the entire grid at the starting resolution.

In block 306, the resolution optimization system computes one or more physical properties of the cells of the computational grid at the starting resolution. The one or more physical properties of the cells may be computed by solving one or more inverse problems. The resolution optimization system may be configured to use the forward modeling algorithms and the target functionals (e.g., for the purpose of setting up a minimization problem associated with the target functionals), find critical points such as local extrema of the target functionals or measures of distances (e.g., by solving the minimization problem), and determine values of the physical properties for each of the cells at such critical points. Additionally, optionally, or alternatively, approximation techniques may be used in determining the critical points. If multiple solutions are found, then the resolution optimization system may proceed to determine optimal grid resolution for each of the multiple solutions in some embodiments. Alternatively, if multiple solutions are found, then the resolution optimization system may select one of the solutions based on one or more selection factors for further computation relating to determining an optimal grid resolution.

In block 308, the resolution optimization system determines one or more reference physical fields. The one or more reference physical fields may be determined/computed by using the forward modeling algorithms, given the values of the one or more physical properties of the cells of the computational grid at the starting grid resolution. The forward modeling algorithms may incorporate other known information such as values of the physical properties of the sea water and the Earth's atmosphere in computing the reference physical fields. The reference physical fields (or reference values of the physical fields) may be labeled $E_0$ for simplicity purposes.

Figure 3B:
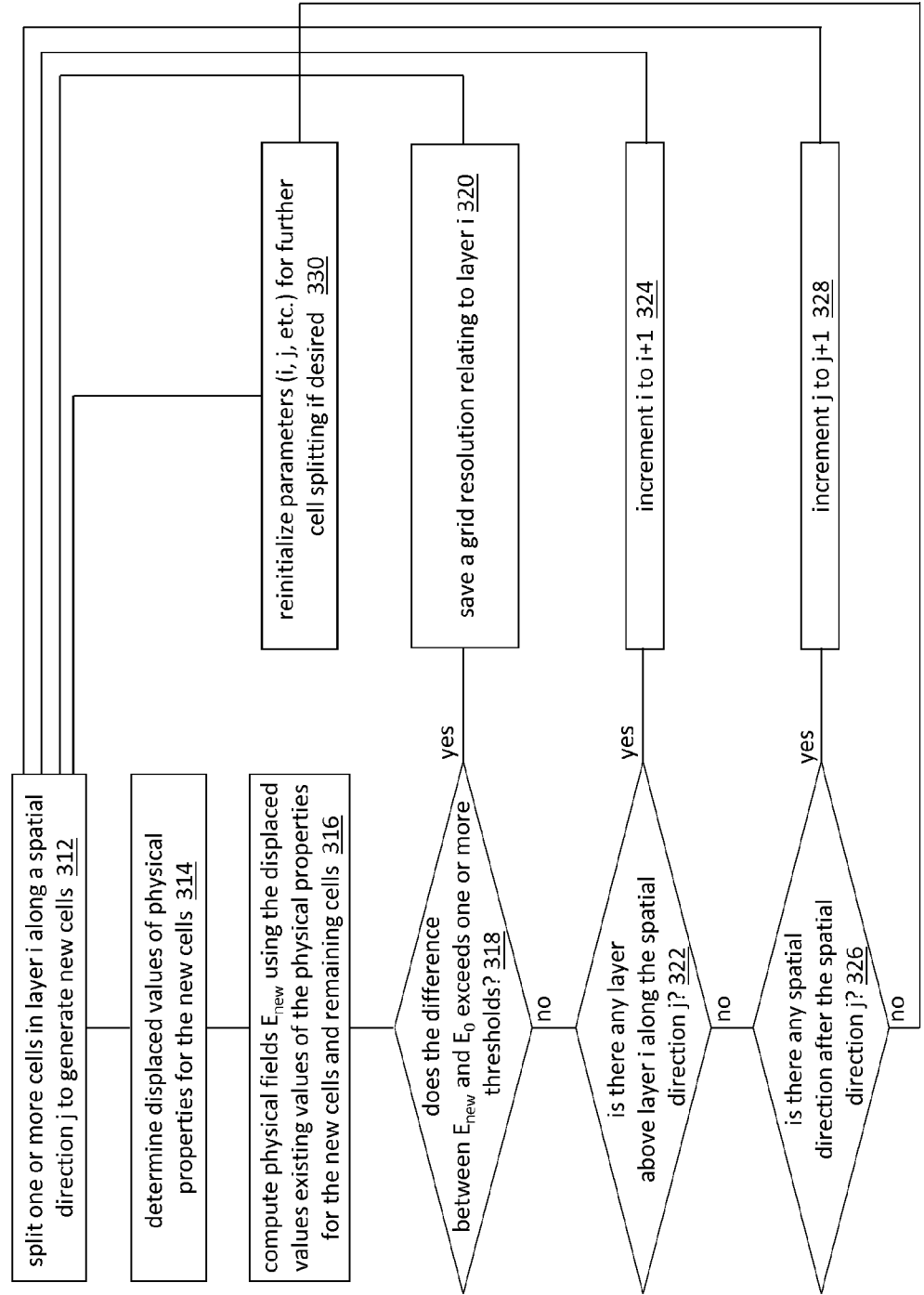

FIG. 3B depicts an example process flow (300-2) for changing grid resolutions towards an optimal grid resolution, in accordance with an embodiment. Additional references may be made to FIG. 4 and FIG. 5. For the purpose of illustration only, the one or more physical properties of a cell may be collectively represented by an electric conductivity $\sigma$ with numeric subscript indexes indicating associations with the cell. The one or more physical fields at a plurality of locations may be collectively represented by an electric field E with a "0" subscript index indicating reference values of the physical fields or with a "new" subscript index indicating calculated values of the physical fields to be compared with the reference values. However, similar steps or techniques may be carried with respect to a wide variety of other types of physical properties and physical fields.

Figure 4:
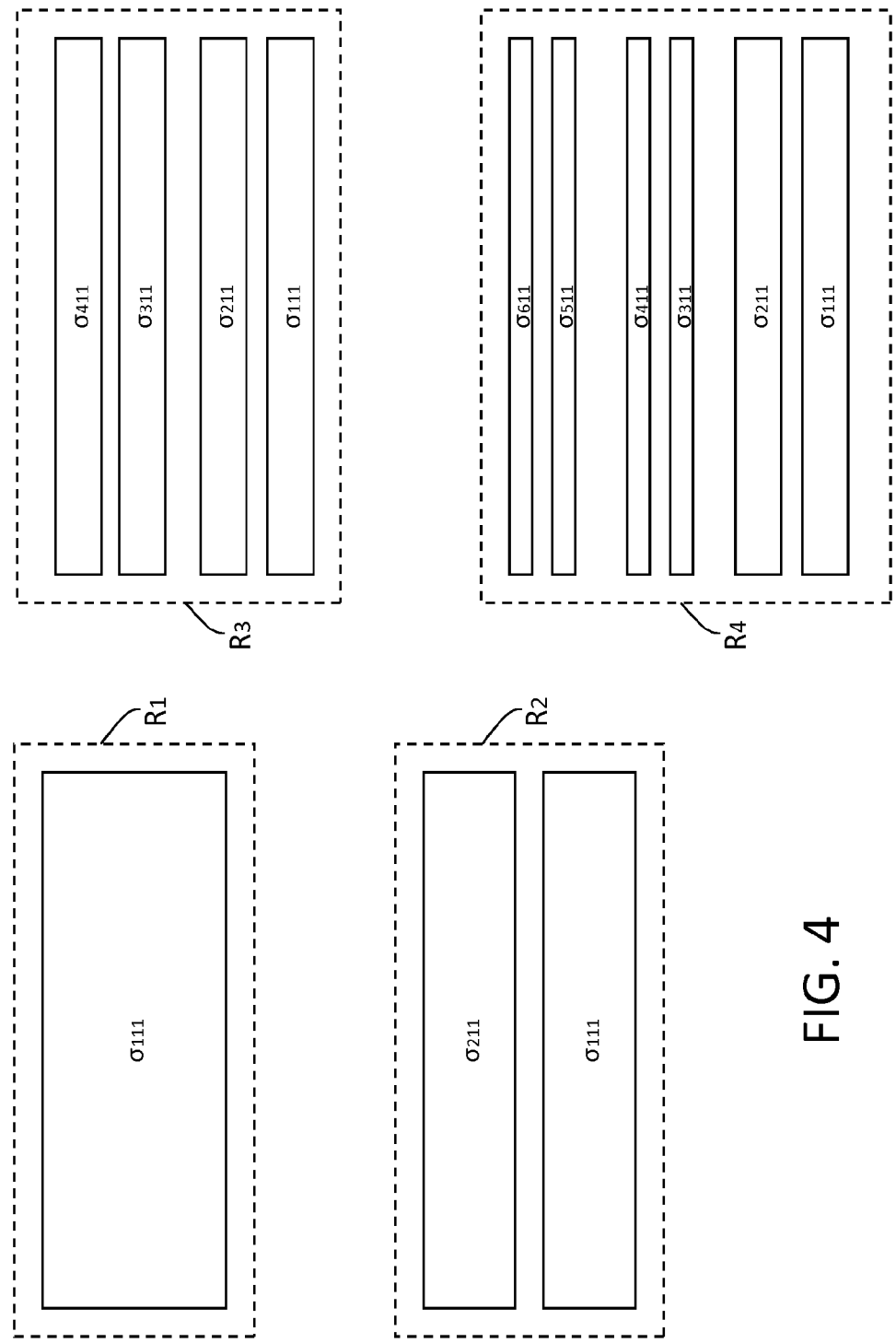
FIG. 4 and FIG. 5 depict example grid resolutions relating to searching for an optimal grid resolution of an adaptive computational grid.
Figure 5:
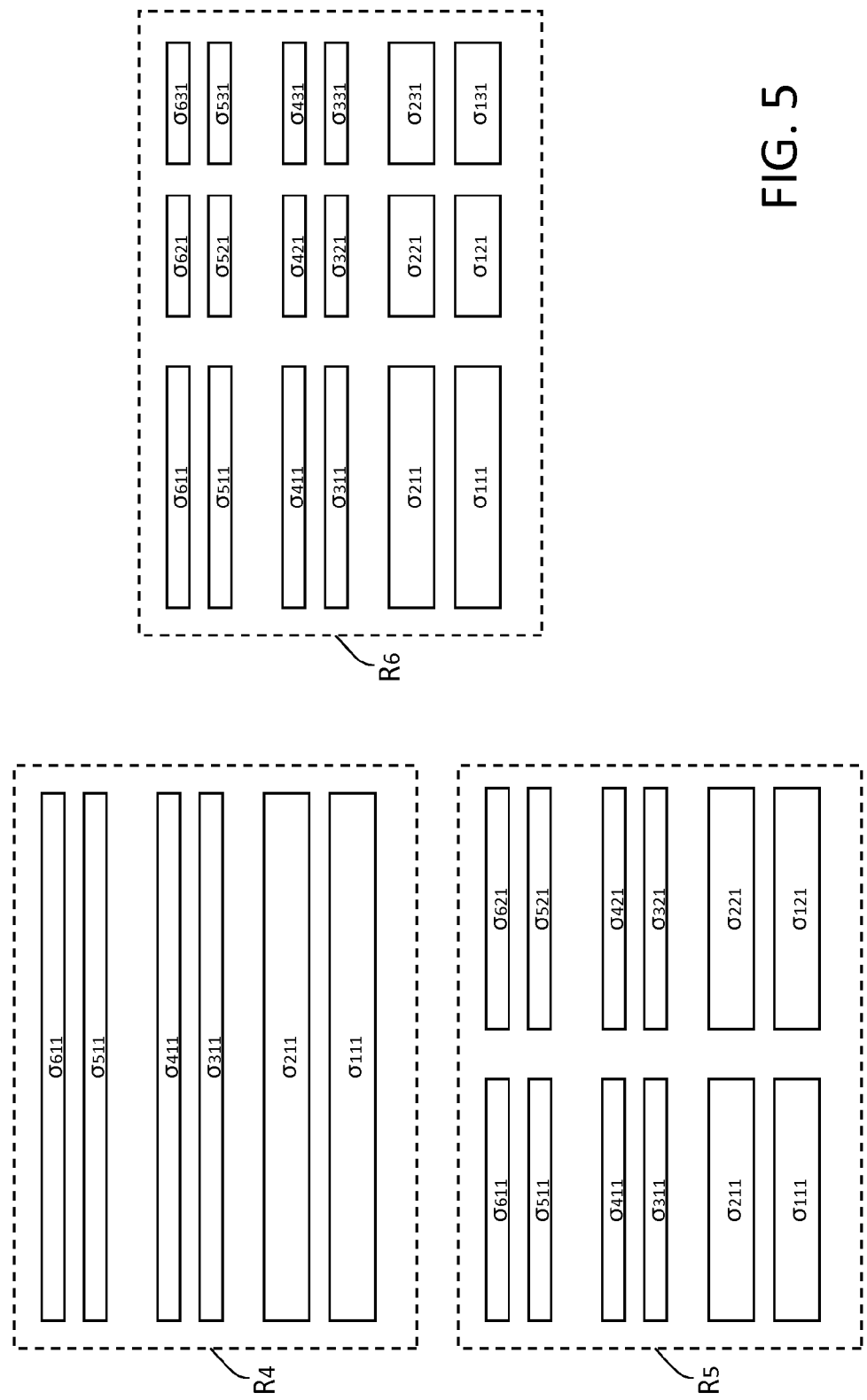

FIG. 4 and FIG. 5 depict an example adaptive computational grid (e.g., 202 of FIG. 2) in a plurality of different grid resolutions. For the purpose of illustration only, R1 represents a starting grid resolution, for example, as specified in the process flow 300-1 of FIG. 3A. In some embodiments, others in the plurality of resolutions (R2, R3, R4, . . . , etc.) may be iteratively and/or recursively derived from their preceding grid resolution using the process flow 300-2 of FIG. 3B.

When there are two or more spatial directions (e.g., in the logical coordinates or in the physical coordinates), cell splitting may be performed along each of the two or more spatial directions. For example, when there are spatial directions $e_1$, $e_2$, and $e_3$, the resolution optimization system may be configured to perform cell splitting along $e_1$ first, then $e_2$, and finally $e_3$.

Additionally, optionally, or alternatively, the resolution optimization system may use a parameter j to keep track of the cell splitting directions. The parameter j may take up values such as 1, 2, and 3 to represent spatial directions $e_1$, $e_2$, and $e_3$, respectively. Alternatively, the parameter j may take up values such as 1, 2, 3, 4, 5, and 6 to represent spatial directions $+e_1$, $-e_1$, $+e_2$, $-e_2$, $+e_3$ and $-e_3$, respectively. Other variations of tracking the cell splitting directions may also be used in various embodiments. The resolution optimization system may set the parameter j to an initial value such as 1 as appropriate.

Additionally, optionally, or alternatively, the resolution optimization system may split cells layer by layer along a spatial direction as indicated by the value of j. The resolution optimization system may use a parameter i to keep track of layers along the spatial direction. The resolution optimization system may set the parameter i to an initial value such as 1 as appropriate.

For the purpose of illustration only, j has three possible values indicating spatial directions $e_1$, $e_2$, and $e_3$, respectively.

Initially, the value of j indicates the spatial direction $e_1$. In the present example, when the process flow 300-2 is performed with the computational grid with the starting grid resolution, there is one layer in each of the spatial directions $e_1$, $e_2$, and $e_3$. Thus, initially, the computational grid with a resolution R1 comprises a single cell. For simplicity reasons, a cell in association with a grid resolution (e.g., R1) may be denoted with its corresponding label (e.g., $\sigma_{111}$) representing the physical properties of the cell. In the label $\sigma_{1mn}$ may represent an index along the $e_1$ direction, m may represent an index along the $e_2$ direction, and n may represent an index along the $e_3$ direction. In some embodiments, the values of $\sigma_{111}$ for cells in association with the starting grid resolution R1 may be determined in block 306 of FIG. 3A.

In block 312, the resolution optimization system splits one or more cells (e.g., a number k of cells) in layer i along a spatial direction as indicated by the value of j to generate new cells with a new grid resolution. Initially, there may be a single cell (e.g., the number of cells, k, is 1) at a single layer (e.g., i=1) in the computational grid at the starting grid resolution R1 is split into two cells (corresponding physical properties $\sigma_{111}$ and $\sigma_{211}$ in association with a new grid resolution R2). It should be noted that the labels $\sigma$ used to represent the physical properties of corresponding cells are functions of grid resolutions. For example, $\sigma_{111}$ with the single cell at the starting grid resolution R1 in FIG. 4 represents the physical properties of that cell at the starting grid resolution R1, whereas $\sigma_{111}$ with one of the two cells at the grid resolution R2 in FIG. 4 specifically indicates the physical properties of that cell at the grid resolution R2.

In block 314, the resolution optimization system determines displaced values of the physical properties for the new cells (e.g., k cells) after cell splitting in layer i in block 312. Values (e.g., conductivity=75) of $\sigma_{111}$ and values (e.g., conductivity=125) of $\sigma_{211}$ in association with R2 may be determined based at least in part on the values (e.g., conductivity=100) of $\sigma_{1ii}$ in association with R1.

In block 316, the resolution optimization system computes the physical fields using the displaced values of the physical properties for the new cells and existing values of the physical properties for the remaining cells that are not affected by cell splitting in blocks 312 and 314. The computation of the physical field may be based in part on the forward modeling algorithms determined in block 302 of FIG. 3A. The new values of the physical fields may be labeled as $E_{new}$ for simplicity reasons.

In block 318, the resolution optimization system determines whether the difference between $E_{new}$ and $E_0$ exceeds one or more thresholds. If so, the process flow (300-2) goes to block 320. Otherwise, the process flow (300-2) goes to block 322. The determination of the difference between $E_{new}$ and $E_0$ may be based on expressions similar to the target functionals in block 302 of FIG. 3A. $E_0$ may be used in place of the measure physical field data in the target functionals. While the target functionals may be used to locate critical points that correspond to certain values of the physical properties, in block 318, the values of the physical properties in association with R2 are known and may be directly inputted into relevant expressions to find out the difference between $E_{new}$ and $E_0$ without a minimization process.

In block 322, the resolution optimization system determines whether there is any layer above layer i along the spatial direction j. If so, i is incremented to (i+1) in block 324 and the process flow (300-2) goes from block 324 to block 312 to continue cell splitting for layer (i+1). If it is determined there is no layer above layer i along the spatial direction j in block 322, the process flow (300-2) goes to block 326.

In block 326, the resolution optimization system determines whether there is any spatial direction for cell splitting after the spatial direction j. If so, j is incremented to (j+1) in block 328 and the process flow (300-2) goes from block 328 to block 312 to start cell splitting for spatial direction (j+1). If it is determined that there is no spatial direction for cell splitting after the spatial direction j in block 326, the process flow (300-2) may be terminated. In the re-initialization in block 330, j may be reset to a beginning value such as 1, and i may be reset to a value such as 1. In some embodiments, in block 330, layers along each of the spatial directions may be re-indexed by a new set of i values to take into account that some layers may have generated new layers.

If it is determined in block 318 that the difference between $E_{new}$ and $E_0$ exceeds the one or more thresholds, then the new cells leading to this determination are not suitable for further cell splitting. In some embodiments, even if there are one or more layers after layer i along the spatial direction j, cells in the one or more layers may not be split into additional cells. In some embodiments, layers before layer i along the spatial direction j may still be split into additional cells.

In block 320, a grid resolution is saved (e.g., in memory, in a database, etc.). In some embodiments, the cells in any excluded layers that are not split into additional cells may be saved in the grid resolution. In some other embodiments, the cells in any excluded layers that are no longer split into additional cells may be excluded from the grid resolution; thus a prior grid resolution before the current cell splitting leading to this block (320) may be saved instead. Additionally, optionally, or alternatively, these cells for which no further splitting is to be performed may be specifically marked/noted. Additionally, optionally, or alternatively, these cells may become eligible for cell splitting processing again if reference values of the physical fields are recomputed.

In some embodiments, additionally, optionally, or alternatively, cells in layers and/or spatial directions that have not been excluded from further cell splitting may be re-initialized and re-indexed. Additionally, optionally, or alternatively, the reference values $E_0$ of the physical fields may be recomputed and reinitialized. The recomputation of the reference values $E_0$ may be performed by solving one or more inverse problems with the computational grid at the saved grid resolution found in block 320.

FIG. 4 depicts a number of cell splitting in an example embodiment. The cell at resolution R1 with the physical properties $\sigma_{111}$ may be split in block 312 in a first iteration into two cells at resolution R2 with the physical properties $\sigma_{111}$ and $\sigma_{211}$, respectively. In the first iteration, the determination in block 318 may be negative. Thus, both cells at resolution R2 are eligible for further cell splitting.

The cell with $\sigma_{111}$ at resolution R2 may be split in a second iteration into two cells with $\sigma_{111}$ and $\sigma_{211}$, respectively, as represented in a resolution R3. For the purpose of explanation only, it is determined in block 318 in the second iteration that the preceding cell splitting causes the difference between new values $E_{new}$ of the physical fields (calculated with two cells $\sigma_{111}$ and $\sigma_{211}$ in resolution R3 and a remaining cell $\sigma_{211}$ in resolution R2) and the reference values $E_0$ of the physical fields to exceed the threshold. As a result, the two cells $\sigma_{111}$ and $\sigma_{211}$ at resolution R3 are excluded from further cell splitting.

Since the cell $\sigma_{211}$ in resolution R2 is after the cell $\sigma_{111}$ in resolution R2 along the $e_1$ direction, the cell $\sigma_{211}$ in resolution R2 may be further split, in a third iteration after the process flow (300-2) goes from block 324 to block 312, into two cells with $\sigma_{311}$ and $\sigma_{411}$, respectively, as represented in resolution R3.

The foregoing process may be repeated to generate finer grid resolutions (e.g., R4) until all the layers in the $e_1$ direction become ineligible for further cell splitting or alternatively until a maximum number of iterations have been made.

Cell splitting may be continued in other directions after the $e_1$ direction in a similar manner. As depicted in FIG. 5, cells at resolution R4 may be split along the $e_2$ direction. In a first iteration along the $e_2$ direction, a number of cells (k=6 cells) with $\sigma_{111}$, $\sigma_{211}$, $\sigma_{311}$, $\sigma_{411}$, $\sigma_{511}$, and $\sigma_{611}$ in a single layer (i=1) at resolution R4 may be split into cells with $\sigma_{111}$, $\sigma_{211}$, $\sigma_{311}$, $\sigma_{411}$, $\sigma_{511}$, $\sigma_{611}$, $\sigma_{121}$, $\sigma_{221}$, $\sigma_{321}$, $\sigma_{421}$, $\sigma_{521}$, and $\sigma_{621}$ in two layers at resolution R5.

The foregoing process may be repeated to generate finer grid resolutions (e.g., R6) until all the layers in the $e_2$ direction become ineligible for further cell splitting or alternatively until a maximum number of iterations have been made. Likewise, the foregoing process may be repeated to generate finer grid resolutions until all the layers in the other directions in the logical coordinates become ineligible for further cell splitting or alternatively until a maximum number of iterations have been made.

Additionally, optionally, or alternatively, the reference values $E_0$ of the physical fields may be recomputed and reinitialized at a given iteration. Recomputing the reference values $E_0$ may be performed by solving one or more inverse problems with the computational grid at a particular grid resolution found with the foregoing process. The particular grid resolution at which the reference values $E_0$ of the physical fields are recomputed may be set as the starting grid resolution, for example, for starting further cell splitting from block 312.

It has been described that a determination may be made (e.g., in block 318 of FIG. 3B) as to whether the difference between calculated values of physical fields determined in part based on the perturbed values of the physical properties and reference values of the physical fields exceeds one or more thresholds. It should be noted that different types of determinations/comparisons may be made between calculated physical field values and reference physical field values. For example, in an alternative embodiment, instead of determining whether the difference exceeds the thresholds, an alternative determination as to whether the difference does not exceed one or more thresholds may be made. In the alternatively embodiment, if the difference is determined to be not exceeding the one or more thresholds, the process flow goes to block 320.

It has been described that cell splitting may be performed along each of one or more spatial directions in order. It should be noted that different ways of traversing a grid may be used. In an alternative embodiment, cell splitting may be performed opposite to a spatial direction. In another alternative embodiment, cell splitting may be performed from one spatial direction to the next spatial direction (e.g., diagonal, random, etc.) without using a specific order in the spatial directions. In some embodiments, cell splitting may be first performed with cells or layers further away from the sea floor, and then work way up toward the sea floor. In some embodiments, cell splitting may be first performed in the middle, and then expand outwards. In some embodiments, cell splitting may be first performed in the fringe, and then work inwards. These and other variations in iteration techniques may be used to increase grid resolution successively with appropriate determinations performed to determine whether further cell splitting should be avoided for certain cells, until a maximum number of iterations are performed and/or until all the cells have been excluded from further cell splitting.

Additionally, optionally, or alternatively, in some embodiments, reference values of physical fields may be recomputed with an adaptive computational grid of a specific grid resolution as determined with one or more times of performance of process flows 300-1 and/or 300-2; the specific grid resolution may be set as a starting grid resolution for performing additional iterations with the process flow 300-2.

Techniques as described herein may be applied to a wide variety of spatial models of the Earth. In addition, a spatial model as described herein may encompass a large or small geographic area. In some embodiments, a spatial model of the Earth is selected to encapsulate one or more specific subterranean features. For example, if a certain size of mineral deposit or oil reserve is desired, the spatial model may be sized to at least contain the certain size in addition to margins. An adaptive computational grid as described herein may be of any of a wide variety of geometric forms or geophysical contents. A cell as described herein may be of any of a wide variety of volumetric forms. A cell may correspond to a physical volume comprising comparable dimensions in all spatial directions. A cell may correspond to a physical volume comprising a thin sheet of very large area. A cell may correspond to a physical volume comprising a regular shape in one or more spatial directions.

Techniques as described herein may be used in land-based surveys as well as sea-based surveys.

In some embodiments, computations as described herein such as forward modeling, cell splitting, perturbing model data, calculating physical fields based on perturbed model data, minimization, distance computing, etc., may be performed at least in part in parallel. Multiple processors, multiple computers, multiple network interfaces, multiple data paths, multiple instruction pipelines, etc., may be used to perform at least some of the process flows (e.g., 300-1 and 300-2) in parallel as described herein.

In some embodiments, measured field data relating to one or more physical fields may be used to determine an optimal grid resolution of a single adaptive computational grid. Different physical fields may be represented in a single modeling space, in a single forward operator, in a single mathematical expression, etc. Different physical fields may be weighed differently in computing distances, in comparing with thresholds, etc. In some other embodiments, measured field data relating to multiple physical fields may be used to determine optimal grid resolutions of multiple adaptive computational grids. Additionally, optionally, or alternatively, processing relating to determining optimal grid resolutions of multiple adaptive computational grids may be run in parallel, in series, or partly in parallel and partly in series. Information obtained from processing relating to one or more physical fields may be used by processing relating to one or more other physical fields.

6. Example Implementations

According to one embodiment, the techniques described herein are implemented by one or more special-purpose computing devices, for example, by one or more special-purpose computing devices that become commercially available after year 2000. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
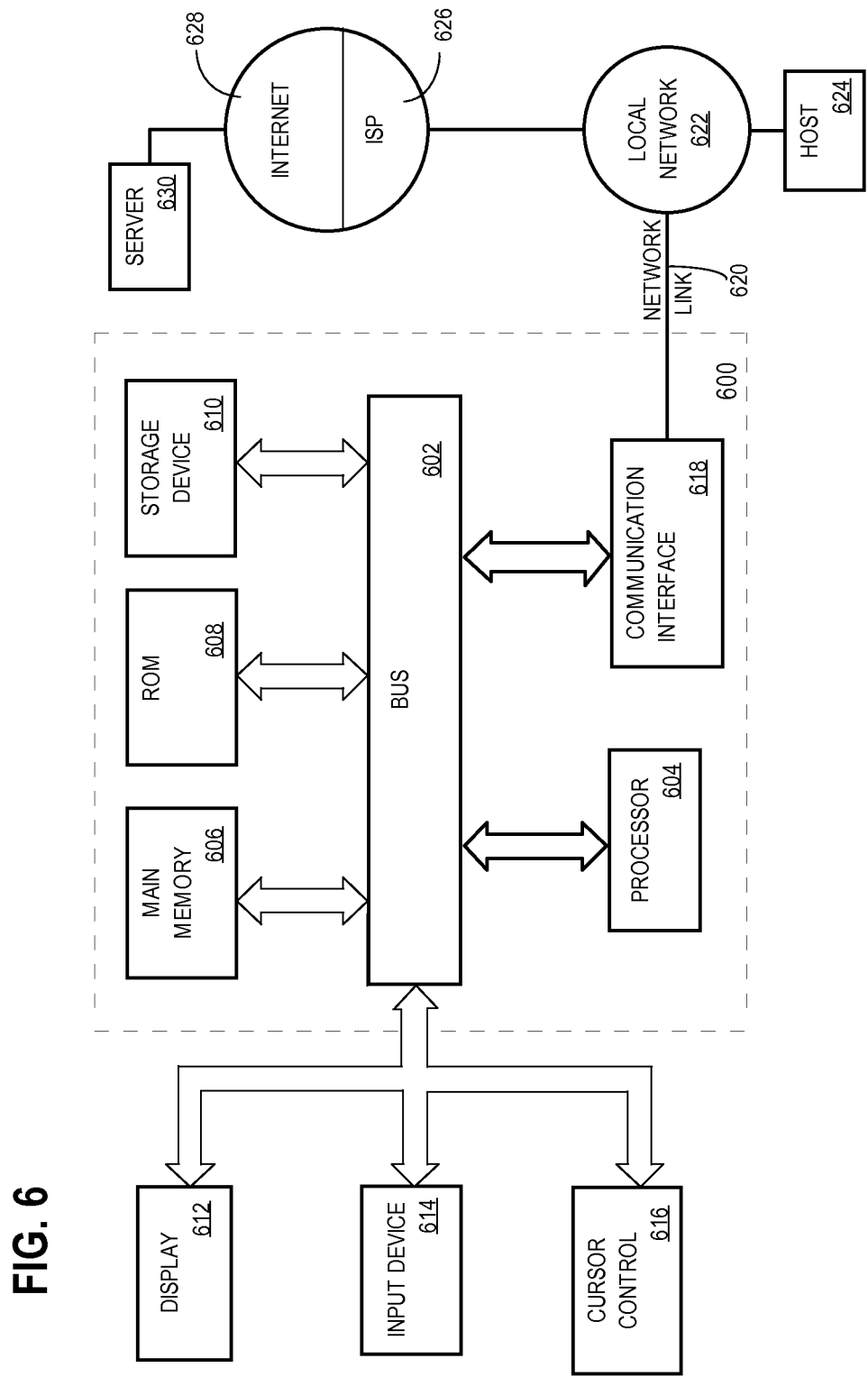
FIG. 6 depicts a block diagram that depicts an example computer system upon which an embodiment may be implemented.

For example, FIG. 6 is a block diagram that depicts an example computer system 600 upon which an embodiment may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. Although bus 602 is depicted as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Figure 7:
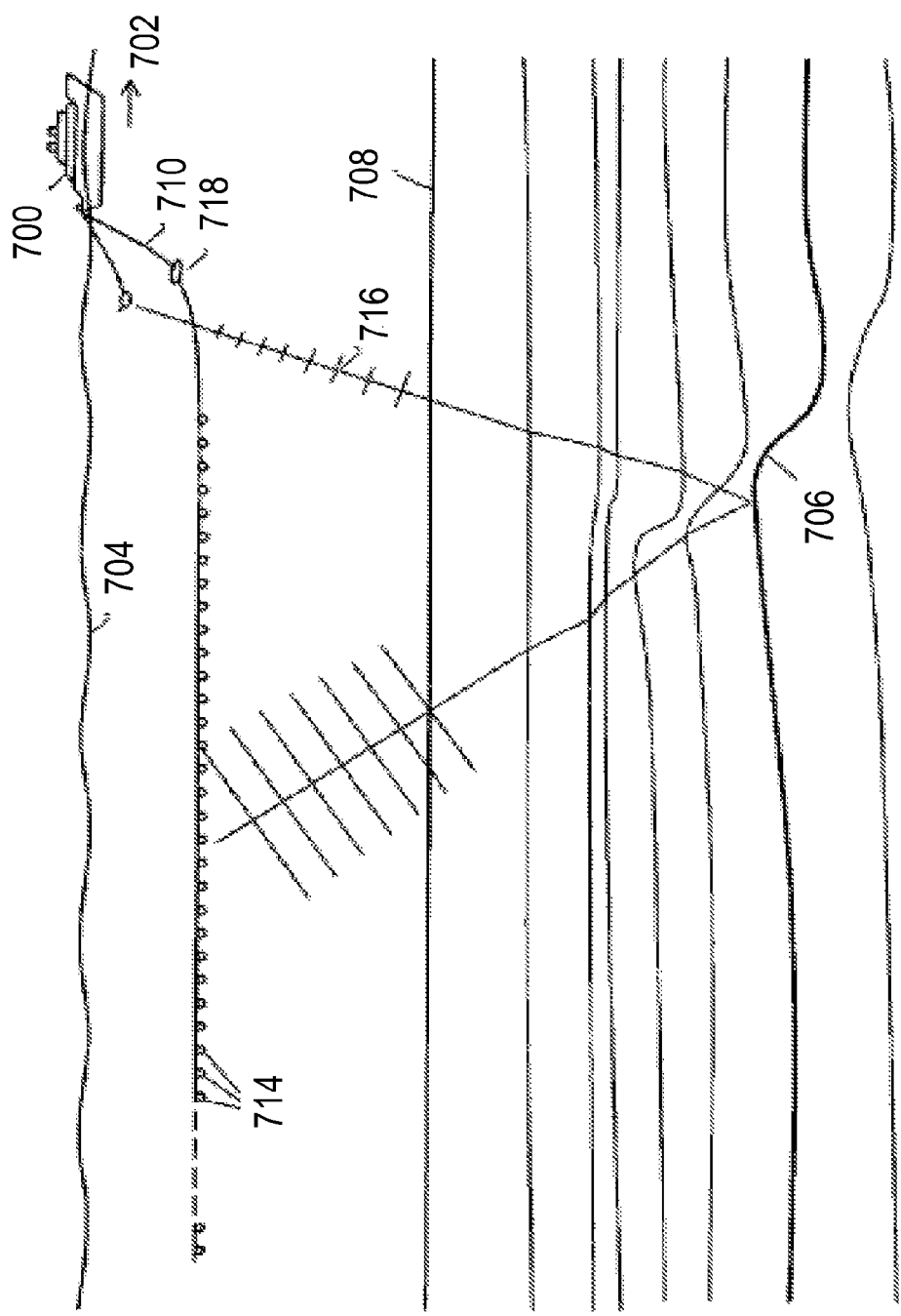
FIG. 7 depicts an example marine seismic survey environment in which an embodiment may be implemented.

Exploration is routinely performed both on land and at sea. In some embodiments, survey ships deploy streamers behind the ship as depicted in FIG. 7, which is an illustration of a side view of an example marine survey environment in which an embodiment may be implemented. Each streamer 710 trails behind ship 700 as the ship moves forward (in the direction of arrow 702), and each streamer includes multiple receivers 714. As illustrated, each streamer 710 may further include a programmable diverter 718 and programmable depth controllers that pull the streamer out to an operating offset distance from the ship's path and down to an operating depth.

Streamers 710 may be up to several kilometers long, and are usually constructed in sections 25 to 100 meters in length that include groups of up to 35 or more spaced receivers. Each streamer 710 typically includes electrical or fiber-optic cabling for interconnecting receivers 714 and the seismic equipment on ship 700. Data may be digitized near receivers 714 and transmitted to ship 700 through the cabling at rates of 7 (or more) million bits of data per second.

As depicted in FIG. 7, seismic survey ship 700 also tows a source 712. Source 712 may be a static source, an impulse source or a vibratory source. Receivers 714 may be used in survey. Various suitable types of receivers are available to detect and record physical data as measure with sensors in the receivers 714. Source 712 and receivers 714 typically deploy below the ocean's surface 704. Processing equipment aboard the ship controls the operation of the source and receivers and records the acquired data.

Marine surveys may provide data for imaging below the ocean surface 704 and include subsurface structures such as structure 706, which lies below the ocean floor 708. Certain physical characteristics or properties deduced from recorded physical data are indicative of oil and/or gas reservoirs.

To image the subsurface structure 706 including determining physical properties of subterranean layers, source 712 emits physical field stimulus 716 that interacts with the water and subsurface structure 706 (and other subsurface structures). One or more physical fields as affected by the water and subsurface structure 706 (and other subsurface structures) are detected and recorded by a pattern of receivers 714. An image of subsurface structure 706 with its physical properties can be obtained after appropriate data processing of the recorded data of the physical fields. Data processing may include the techniques described above.

7. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus comprising:
one or more processors;
one or more storage media storing instructions, which, when processed by the one or more processors, cause:
computing, based on one or more first values of one or more physical properties for a first set of cells, first values of one or more physical fields at first spatial locations, the first set of cells constituting a grid that represents a spatial domain of exploration, the first values of the one or more physical properties having been obtained from the spatial domain of exploration;
transforming the first set of cells into a second set of cells by splitting at least one cell in the first set of cells into two or more new cells;
determining values of the one or more physical properties for the two or more new cells based upon the one or more first values of the one or more physical properties for the first set of cells;
computing, based on second values of the one or more physical properties for the second set of cells, second values of the one or more physical fields at second spatial locations; and
determining whether differences between the second values of the one or more physical fields at the second spatial locations and the first values of the one or more physical fields at the first spatial locations satisfy one or more criteria for further cell splitting of the two or more new cells.

2. The apparatus of claim 1, wherein the instructions comprise further instructions, which, when processed by the one or more processors, cause:
in response to determining that the differences between the second values of the one or more physical fields at the second spatial locations and the first values of the one or more physical fields at the first spatial locations do not satisfy the one or more criteria, performing:
transforming the first set of cells into a different second set of cells by splitting one or more other cells in the first set of cells into two or more other new cells, wherein the one or more other cells are selected from a plurality of cells in the first set of cells ordered along a first spatial direction, and wherein the plurality of cells are all on a first side of the at least one cell in relation to the first spatial direction;
determining two or more new values of the one or more physical properties for the two or more other new cells based upon the one or more first values of the one or more physical properties for the first set of cells; and
computing, based on the different second values of the one or more physical properties for the different second set of cells, different second values of the one or more physical fields at different second spatial locations.

3. The apparatus of claim 1, wherein the instructions comprise further instructions, which, when processed by the one or more processors, cause:
in response to determining that the differences between the second values of the one or more physical fields at the second spatial locations and the first values of the one or more physical fields at the first spatial locations satisfy one or more criteria, performing:
transforming the second set of cells into a third set of cells by splitting one or more cells in the second set of cells into two or more second new cells, wherein both the at least one cell and the one or more cells are selected from a plurality of cells in the second set of cells ordered along a first spatial direction, and wherein the plurality of cells are all on a second side of the at least one cell in relation to the first spatial direction;
determining two or more new values of the one or more physical properties for the two or more other new cells; and
computing, based on third values of the one or more physical properties for the third set of cells, third values of the one or more physical fields at third spatial locations.

4. The apparatus of claim 1, wherein the instructions comprise further instructions, which, when processed by the one or more processors, cause:
in response to determining that the differences between the second values of the one or more physical fields at the second spatial locations and the first values of the one or more physical fields at the first spatial locations satisfy the one or more criteria, performing:
transforming the second set of cells into a third set of cells by splitting one or more cells in the second set of cells into two or more second new cells, wherein the at least one cell comprises a terminating cell in a first plurality of cells, in the first set of cells, ordered along a first spatial direction, wherein the one or more cells in the second set of cells are selected from a second plurality of cells, in the second set, ordered along a second different spatial direction;
determining two or more new values of the one or more physical properties for the two or more second new cells; and
computing, based on third values of the one or more physical properties for the third set of cells, third values of the one or more physical fields at third spatial locations.

5. The apparatus of claim 1, wherein the one or more physical properties comprise one or more of electric conductivity, magnetic permeability, mass density, elasticity, pressure, particle velocity, or other types of physical properties.

6. The apparatus of claim 1, wherein the one or more physical fields comprise one or more of electric fields, magnetic fields, electromagnetic fields, acoustic fields, or other types of physical fields.

7. The apparatus of claim 1, wherein the first spatial locations comprise at least one common spatial location with the second spatial locations.

8. The apparatus of claim 1, wherein the spatial domain of exploration comprises a subsurface formation below a body of water.

9. The apparatus of claim 1, wherein the first values have been obtained by a geophysical survey.

10. One or more non-transitory storage media storing instructions which, when executed by one or more computing devices, cause:
computing, based on one or more first values of one or more physical properties for a first set of cells, first values of one or more physical fields at first spatial locations, the first set of cells constituting a grid that represents a spatial domain of exploration, the first values of the one or more physical properties having been obtained from the spatial domain of exploration;
transforming the first set of cells into a second set of cells by splitting at least one cell in the first set of cells into two or more new cells;

determining values of the one or more physical properties for the two or more new cells based upon the one or more first values of the one or more physical properties for the first set of cells;

computing, based on second values of the one or more physical properties for the second set of cells, second values of the one or more physical fields at second spatial locations; and determining whether differences between the second values of the one or more physical fields at the second spatial locations and the first values of the one or more physical fields at the first spatial locations satisfy one or more criteria for further cell splitting of the two or more new cells.

11. The one or more non-transitory storage media of claim 10, wherein the instructions comprise further instructions, which, when processed by the one or more processors, cause:

in response to determining that the differences between the second values of the one or more physical fields at the second spatial locations and the first values of the one or more physical fields at the first spatial locations do not satisfy the one or more criteria, performing:

splitting one or more other cells in the first set of cells into two or more other new cells, thereby transforming the first set of cells into a different second set of cells, wherein the one or more other cells are selected from a plurality of cells in the first set of cells ordered along a first spatial direction, and wherein the plurality of cells are all on a first side of the at least one cell in relation to the first spatial direction;

determining two or more new values of the one or more physical properties for the two or more other new cells based upon the one or more first values of the one or more physical properties for the first set of cells; and computing, based on the different second values of the one or more physical properties for the different second set of cells, different second values of the one or more physical fields at different second spatial locations.

12. The one or more non-transitory storage media of claim 10, wherein the instructions comprise further instructions, which, when processed by the one or more processors, cause:

in response to determining that the differences between the second values of the one or more physical fields at the second spatial locations and the first values of the one or more physical fields at the first spatial locations satisfy one or more criteria, performing:

transforming the second set of cells into a third set of cells by splitting one or more cells in the second set of cells into two or more second new cells, wherein both the at least one cell and the one or more cells are selected from a plurality of cells in the second set of cells ordered along a first spatial direction, and wherein the plurality of cells are all on a second side of the at least one cell in relation to the first spatial direction;

determining two or more new values of the one or more physical properties for the two or more other new cells; and computing, based on third values of the one or more physical properties for the third set of cells, third values of the one or more physical fields at third spatial locations.

13. The one or more non-transitory storage media of claim 10, wherein the instructions comprise further instructions, which, when processed by the one or more processors, cause:

in response to determining that the differences between the second values of the one or more physical fields at the second spatial locations and the first values of the one or more physical fields at the first spatial locations satisfy the one or more criteria, performing:

transforming the second set of cells into a third set of cells by splitting one or more cells in the second set of cells into two or more second new cells, wherein the at least one cell comprises a terminating cell in a first plurality of cells, in the first set of cells, ordered along a first spatial direction, wherein the one or more cells in the second set of cells are selected from a second plurality of cells, in the second set, ordered along a second different spatial direction;

determining two or more new values of the one or more physical properties for the two or more second new cells; and computing, based on third values of the one or more physical properties for the third set of cells, third values of the one or more physical fields at third spatial locations.

14. The one or more non-transitory storage media of claim 10, wherein the one or more physical properties comprise one or more of electric conductivity, magnetic permeability, mass density, elasticity, pressure, particle velocity, or other types of physical properties.

15. The one or more non-transitory storage media of claim 10, wherein the one or more physical fields comprise one or more of electric fields, magnetic fields, electromagnetic fields, acoustic fields, or other types of physical fields.

16. The one or more non-transitory storage media of claim 10, wherein the first spatial locations comprise at least one common spatial location with the second spatial locations.

17. The one or more non-transitory storage media of claim 10, wherein the spatial domain of exploration comprises a subsurface formation below a body of water.

18. The one or more non-transitory storage media of claim 10, wherein the first values have been obtained by a geophysical survey.

19. A method comprising:

computing, based on one or more first values of one or more physical properties for a first set of cells, first values of one or more physical fields at first spatial locations, the first set of cells constituting a grid that represents a spatial domain of exploration, the first values of the one or more physical properties having been obtained from the spatial domain of exploration;

transforming the first set of cells into a second set of cells by splitting at least one cell in the first set of cells into two or more new cells;

determining values of the one or more physical properties for the two or more new cells based upon the one or more first values of the one or more physical properties for the first set of cells;

computing, based on second values of the one or more physical properties for the second set of cells, second values of the one or more physical fields at second spatial locations; and determining whether differences between the second values of the one or more physical fields at the second spatial locations and the first values of the one or more physical fields at the first spatial locations satisfy one or more criteria for further cell splitting of the two or more new cells.

20. The method of claim 19, wherein the instructions comprise further instructions, which, when processed by the one or more processors, cause:

in response to determining that the differences between the second values of the one or more physical fields at the second spatial locations and the first values of the one or more physical fields at the first spatial locations do not satisfy the one or more criteria, performing:
  splitting one or more other cells in the first set of cells into two or more other new cells, thereby transforming the first set of cells into a different second set of cells, wherein the one or more other cells are selected from a plurality of cells in the first set of cells ordered along a first spatial direction, and wherein the plurality of cells are all on a first side of the at least one cell in relation to the first spatial direction;
  determining two or more new values of the one or more physical properties for the two or more other new cells based upon the one or more first values of the one or more physical properties for the first set of cells; and
  computing, based on the different second values of the one or more physical properties for the different second set of cells, different second values of the one or more physical fields at different second spatial locations.

21. The method of claim 19, wherein the instructions comprise further instructions, which, when processed by the one or more processors, cause:
  in response to determining that the differences between the second values of the one or more physical fields at the second spatial locations and the first values of the one or more physical fields at the first spatial locations satisfy one or more criteria, performing:
    transforming the second set of cells into a third set of cells by splitting one or more cells in the second set of cells into two or more second new cells, wherein both the at least one cell and the one or more cells are selected from a plurality of cells in the second set of cells ordered along a first spatial direction, and wherein the plurality of cells are all on a second side of the at least one cell in relation to the first spatial direction;
    determining two or more new values of the one or more physical properties for the two or more other new cells; and
    computing, based on third values of the one or more physical properties for the third set of cells, third values of the one or more physical fields at third spatial locations.

22. The method of claim 19, wherein the instructions comprise further instructions, which, when processed by the one or more processors, cause:
  in response to determining that the differences between the second values of the one or more physical fields at the second spatial locations and the first values of the one or more physical fields at the first spatial locations satisfy the one or more criteria, performing:
    transforming the second set of cells into a third set of cells by splitting one or more cells in the second set of cells into two or more second new cells, wherein the at least one cell comprises a terminating cell in a first plurality of cells, in the first set of cells, ordered along a first spatial direction, wherein the one or more cells in the second set of cells are selected from a second plurality of cells, in the second set, ordered along a second different spatial direction;
    determining two or more new values of the one or more physical properties for the two or more second new cells; and
    computing, based on third values of the one or more physical properties for the third set of cells, third values of the one or more physical fields at third spatial locations.

23. The method of claim 19, wherein the one or more physical properties comprise one or more of electric conductivity, magnetic permeability, mass density, elasticity, pressure, particle velocity, or other types of physical properties.

24. The method of claim 19, wherein the one or more physical fields comprise one or more of electric fields, magnetic fields, electromagnetic fields, acoustic fields, or other types of physical fields.

25. The method of claim 19, wherein the spatial domain of exploration comprises a subsurface formation below a body of water.

26. The method of claim 19, wherein the first values have been obtained by a geophysical survey.

27. A method comprising:
  computing reference values of one or more physical fields based on model data for an adaptive computational grid with a starting grid resolution using one or more forward model mappings, the adaptive computational grid covering a spatial domain of exploration, the model data at least comprising physical property values of cells in the adaptive computational grid and having been obtained from the spatial domain of exploration;
  (a) splitting one or more cells in the adaptive computational grid into two or more new cells;
  (b) perturbing the model data by associating new physical property values that are different from those of the one or more cells to the two or more new cells;
  (c) computing new values of the one or more physical fields based on the perturbed modeling data using the one or more forward model mappings;
  (d) determining differences between the new values of the one or more physical fields and the reference values of the one or more physical fields;
  (e) determining whether cell splitting should continue based at least in part on the differences in step (d); and
  (f) in response to determining that cell splitting should continue, repeating steps (a) through (e).

* * * * *